UNITED STATES PATENT OFFICE.

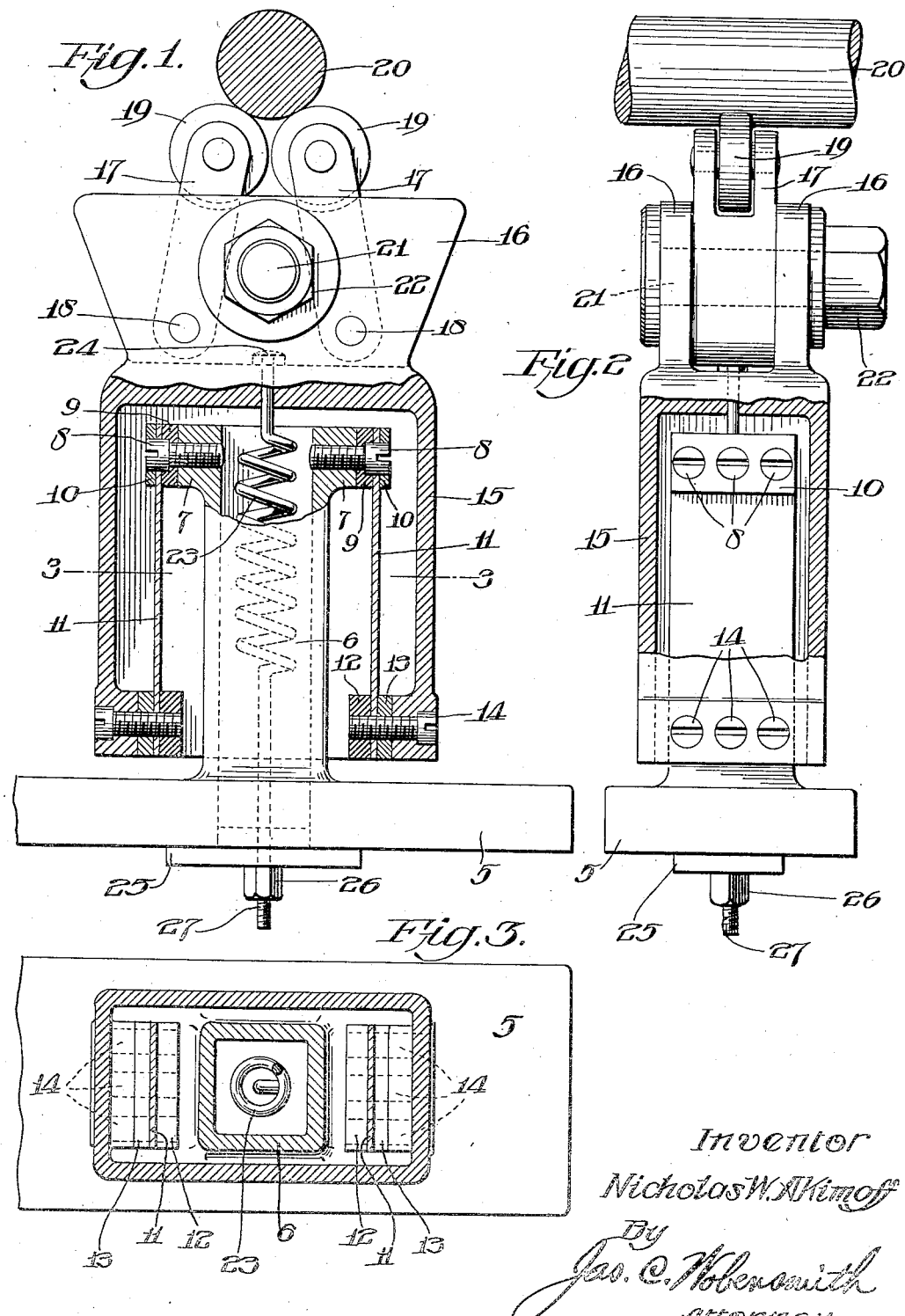

NICHOLAS W. AKIMOFF, OF PHILADELPHIA, PENNSYLVANIA, ASSIGNOR TO VIBRATION SPECIALTY COMPANY, A CORPORATION OF DELAWARE.

SHAFT-SUPPORT FOR TESTING PURPOSES.

1,347,316.　　　　Specification of Letters Patent.　　Patented July 20, 1920.

Application filed July 18, 1917. Serial No. 181,228.

*To all whom it may concern:*

Be it known that I, NICHOLAS W. AKIMOFF, a citizen of the United States, residing at Philadelphia, in the county of Philadelphia and State of Pennsylvania, have invented certain new and useful Improvements in Shaft-Supports for Testing Purposes, of which the following is a specification.

My invention relates to an improved form of shaft support for testing purposes, that is to say, to a device for supporting or journaling one end of a shaft of a rotatable body while the same is being tested for chatter due to improper distribution of the mass of said rotatable body. The principal object of my invention is to provide a shaft support or journaling device which is so constructed and arranged that the chatter of the rotatable body under test not only will not be dampened, but on the contrary will be made more perceptible by making the period of free oscillation of the support synchronize with the rate of rotation of the body.

My invention stated in general terms contemplates the provision of an improved form of shaft support adapted to oscillate, without damping, transversely to the initial axis of the shaft and having means whereby the periodicity of pendular like oscillation of the support may be adjusted to bring the same into resonance or synchronism with the rate of rotation of the body while the same is being tested, and, in this manner, considerably increasing the amplitude of vibration so that the same may be more readily observed. My present invention more specifically considered also contemplates certain structural features whereby the above features will be more efficiently obtained.

The nature and characteristic features of my invention will be more readily understood from the following description taken in connection with the accompanying drawings forming part hereof in which, Figure 1 is a side elevation, partly in section, of a shaft support embodying the main features of my present invention.

Fig. 2 is a side elevation thereof, also partly in section, and;

Fig. 3 is a horizontal section thereof taken on the line 3—3 of Fig. 1.

Referring to the drawings, in the particular embodiment of my invention therein shown, 5 is a base plate adapted to be bolted or otherwise secured to the ways of a lathe or other device for rotating the shaft of the body to be tested for chatter due to improper distribution of the mass thereof. The base plate 5 is provided with an upwardly extending centrally disposed hollow standard 6, the upper end of which is provided with laterally extending lugs 7. To each of the lugs 7 there is secured, by means of screws or other suitable fastening devices, two plates 9 and 10 between which there is brazed or soldered the upper end of a plate spring 11. Each of the plate springs 11 extends downwardly and is provided at its lower free end with two plates 12 and 13 which are also soldered or brazed to said spring plates 11. The plates 12 and 13 are interiorly secured, by means of screws 14 or other suitable fastening devices, to the lower end of a housing 15, which housing 15 surrounds the central standard 6 and its associated parts. The upper end of the housing 15 is provided with two wings 16—16 between which there are mounted two links 17—17, each of which is pivoted at its lower end in the housing 15 by means of a spindle 18 and each link 17 carries at its upper end a roller 19 which may comprise the outer ring of a ball or roller bearing of standard type. The shaft 20 of the body to be tested is adapted to be mounted upon the periphery of the bearing rollers 19 which as above stated are carried by the links 17. A bolt 21 passes through the wings 16 of the upper end of the housing 15 and serves when the nut 22 thereof is suitably tightened to clamp the links 17 in any desired angular position to compensate for differences in sizes of the shaft 20 whereby the bearing rollers 19 may be suitably positioned to support the shaft 20 in the proper position relative thereto to thereby secure the most efficient operation.

Mounted within the hollow standard 6 is a centrally arranged helical spring 23 the upper end of which is straightened out and extends through a solid portion of the housing 15 and is suitably secured thereto as at 24 by riveting or otherwise. The lower end of the helical spring 23 is also straightened out and extends below the lower surface of the base plate 5. This end of the spring 23 is suitably threaded and passes through a bearing plate 25 forming a support against the outer surface of which bears a nut 26. The nut 26 is threaded on the straight end 27 of the spring 23 whereby the tension of said spring 23 may be varied at will during operation of the device.

It will be noted that by the above arrangement the shaft 20 will be supported against vertical movement, but will be free to oscillate or vibrate laterally without damping, on account of the provision of the plate springs 11 upon which the oscillatory portion of the structure is supported. It will also be noted that the tension imparted by the adjusting spring 23 will be transmitted to the plate springs 11 thereby insuring a more efficient functioning of said plate springs 11. Furthermore the provision of at least two of such plate springs 11 laterally disposed will result in a substantially straight line oscillation of the movable portion of the device.

By the structure thus provided there will be no tendency to dampen the vibration as would occur if friction producing pivot devices were employed to mount the oscillatory portion of the device, and that the pendular like periodicity of the oscillatory portion of the device may be readily adjusted during the test, while the body under examination is rotating, to thereby synchronize said periodicity with the rate of rotation of the body and thus increase the amplitude of the vibration so that the same will be more readily perceptible.

Having thus described my invention, what I claim as new and desire to secure by Letters Patent is:—

1. In a device of the character described for supporting a rotatable shaft against vertical movement while permitting the same to oscillate laterally without damping, the combination of a stationary support, plate springs depending downwardly from a portion of said stationary support, and a vibratory housing element secured to the lower free ends of said plate springs and surrounding the same and carrying means for journaling the rotatable shaft.

2. In a device of the character described for supporting a rotatable shaft against vertical movement while permitting the same to oscillate laterally without damping, the combination of a stationary support, plate springs depending downwardly from a portion of said stationary support, a vibratory element carried by the lower free ends of said plate springs and carrying means for journaling the rotatable shaft, and means for varying the periodicity of oscillation of said pendular element.

3. In a device of the character described for supporting a rotatable shaft against vertical movement while permitting the same to oscillate laterally without damping, the combination of a stationary support, plate springs depending downwardly from a portion of said stationary support, a vibratory element carried by the lower free ends of said plate springs and carrying means for journaling the rotatable shaft, and means for varying the periodicity of oscillation of said vibratory element comprising a helical spring connected at one end to the stationary support and at the other end to the vibratory element and means for varying the tension of said spring.

4. In a device of the character described for supporting a rotatable shaft against vertical movement while permitting the same to oscillate laterally without damping, the combination of a stationary support, plate springs depending downwardly from a portion of said stationary support, a vibratory element carried by the lower free ends of said plate springs and carrying means for journaling the rotatable shaft, and means for varying the periodicity of oscillation of said vibratory element comprising a helical spring connected at one end to the stationary support and at the other end to the pendular element, the end connected to the stationary support being threaded to provide means for varying the tension of said spring.

5. In a device of the character described for supporting a rotatable shaft against vertical movement while permitting the same to oscillate laterally without damping, the means for journaling the rotatable shaft including a pair of bearing rollers upon the periphery of which said shaft is adapted to rest, and a pair of pivoted links at the free ends of which said bearing rollers are carried.

6. In a device of the character described for supporting a rotatable shaft against vertical movement while permitting the same to oscillate laterally without damping, the means for journaling the rotatable shaft including a pair of bearing rollers upon the periphery of which said shaft is adapted to rest, a pair of pivoted links at the free ends of which said bearing rollers are carried and means for securing said links in any desired angular position with respect to each other.

In testimony whereof I have hereunto signed my name.

NICHOLAS W. AKIMOFF.